United States Patent [19]
Lai

[11] Patent Number: 5,237,635
[45] Date of Patent: Aug. 17, 1993

[54] SIGNAL CABLE HAVING METAL-PLATED POLYMER SHIELDING

[75] Inventor: Vu A. Lai, Austin, Tex.

[73] Assignee: W. L. Gore & Associates, Inc., Newark, Del.

[21] Appl. No.: 915,971

[22] Filed: Jul. 15, 1992

[51] Int. Cl.$^5$ ............................................. G02B 6/44
[52] U.S. Cl. ................................... 385/101; 385/103; 174/110 R
[58] Field of Search ............... 385/100, 101, 102, 103; 174/70 A, 98, 99 R, 110 R, 119 R

[56] References Cited

U.S. PATENT DOCUMENTS

| | | | |
|---|---|---|---|
| 3,883,218 | 5/1975 | Slaughter | 385/103 |
| 4,158,478 | 6/1979 | D'Auria et al. | 385/101 |
| 4,272,155 | 6/1981 | Slaughter | 385/101 |
| 4,443,657 | 4/1984 | Hill et al. | 385/114 |
| 4,653,851 | 3/1987 | Pedersen et al. | 385/103 |
| 4,741,594 | 5/1988 | Suzuki | 385/115 |
| 5,002,359 | 3/1991 | Sayegh | 385/107 |
| 5,138,684 | 8/1992 | Bullock et al. | 385/102 |
| 5,189,721 | 2/1993 | Sayegh et al. | 385/114 |

*Primary Examiner*—Frank Gonzalez
*Attorney, Agent, or Firm*—Gary A. Samuels

[57] ABSTRACT

A thin flexible signal cable including at least one electrical signal cable and optionally one or more optical fiber cables, having a thinly metal-plated polymer tape shielding layer over a porous insulation. Expanded polytetrafluoroethylene insulation and polyamide tape are preferred.

12 Claims, 2 Drawing Sheets

SIGNAL CABLE HAVING METAL-PLATED POLYMER SHIELDING

FIELD OF THE INVENTION

The invention relates to metal-shielded signal cables in which one or more electric signal conductors or optical fiber cables are surrounded as a unit by extruded or tape-wrapped insulation, a metal shielding, and an optional outer protective polymer jacket.

BACKGROUND OF THE INVENTION

In the field of coaxial electric signal cables there is voluminous prior art on variations of construction and composition of the center signal conductor, the insulation, also called the dielectric, the coaxial shielding, and the optional protective outer jacket of the cables.

Continuing efforts are made to provide a cable having the best electrical characteristics, the lightest weight, the greatest flexibility, and the smallest size possible. These qualities along with the best economy of manufacture are needed considering the necessary qualities the cable must have to be useful to meet the increasingly high specifications necessary for application in modern electronic apparatus, such as computers, communications satellites, inhabited space modules and space craft, and ground communications equipment.

Much improvement in cable properties has been accomplished in recent years by utilization of foamed insulation, such as foamed thermoplastic polymers and especially porous expanded polytetrafluoroethylene (ePTFE), such as that disclosed in U.S. Pat. Nos. 3,953,566, 3,962,153, 4,096,227, 4,187,390, 4,902,423, and 4,478,665 (assigned to W. L. Gore & Associates, Inc.), for example. To achieve an insulation having the lowest dielectric constant, less of these materials are required for a given dielectric constant.

Thin copper or aluminum wire tubing has been extruded around center conductors and insulation to provide shielding of the cable against outside electromagnetic field (EM) interference. Spirally wrapped metal foil and served or braided metal wires or tape also serve this purpose as does metal-plated (metallized) polymer tape wrapped spirally or cigarette wrapped around the insulation. If protection of the cable against electromagnetic interference (EMI) or electromagnetic radiation is desired, a conductive metal may be used in the shielding.

It has also become useful to bundle more than one of the cables described above together in a single cable and to include one or more optical fiber signal cables in the bundle with electric signal cables.

The present invention provides even further improvements in size, weight, and flexibility for a given level of electric signal transmission speed and quality and protection against outside interference.

SUMMARY OF THE INVENTION

The invention comprises one or more signal Cables having a thin layer of flexible polymer wrapped or extruded around the insulation surrounding the signal cable or cables. This thin polymer layer has a non-smooth surface which is thinly plated to a thickness of preferably less than one micron with a metal by well-known methods. Copper, aluminum, silver, nickel, iron, or cobalt may be used. A spiral wrap of polymer tape or a very thin extruded layer of the polymer may be used. The polymer must have a surface containing crevaces, voids, and other irregularities to which metal may cling or be wedged into for a strong mechanical grip of the metal on the polymer. Polyamide (nylon) polymer is preferred and many methods are known in the art for metal-plating it by electroplating, electroless plating, sputtering, or vacuum deposition methods. The plated polyamide is smooth with no gaps in the metal and provides electromagnetic field shielding much like a solid metal tube or solid metal cage.

The polyamide tape may be first plated then wrapped around the cable insulation or the tape may be wrapped around the insulation, heat sealed, then metal-plated or metallized.

Useful references to metal plating of polyamide (nylon) include U.S. Pat. Nos. 3,792,520, 4,247,596, 4,645,574, 4,362,779, 3,801,368, 3,686,019, 2,862,783, 4,162,209, 3,235,473, 2,859,130, and 1,099,934.

The signal cables may be one or more electric signal cables comprising a conductive metal center conductor surrounded by an insulation, preferably of expanded polytetrafluoroethylene (ePTFE), which is fully described in U.S. Pat. Nos. 3,953,566, 3,962,153, 4,096,227, 4,187,390, 4,902,423, and 4,428,665, assigned to W. L. Gore & Associates, Inc. The signal cables may also comprise one or more optical fiber cables, which, when present, are only included with electric signal cables, which must be present also in the cable of the invention.

The optical fiber cables may be of quartz glass or doped silica glass which may be coated with an amorphous fluoropolymer or glass cladding of lower refractive index than the fiber. The optical fiber may also comprise a polymer fiber. The optical fiber is sheathed with a soft ePTFE buffer layer. The buffered fibers (or fiber) as a unit with one or more electric signal cables is then covered with an extruded or tape-wrapped layer of polyamide polymer as described above.

DETAILED DESCRIPTION OF THE INVENTION

The invention is now described with reference to the drawings to provide more details of and to better describe the invention.

Figure 1:
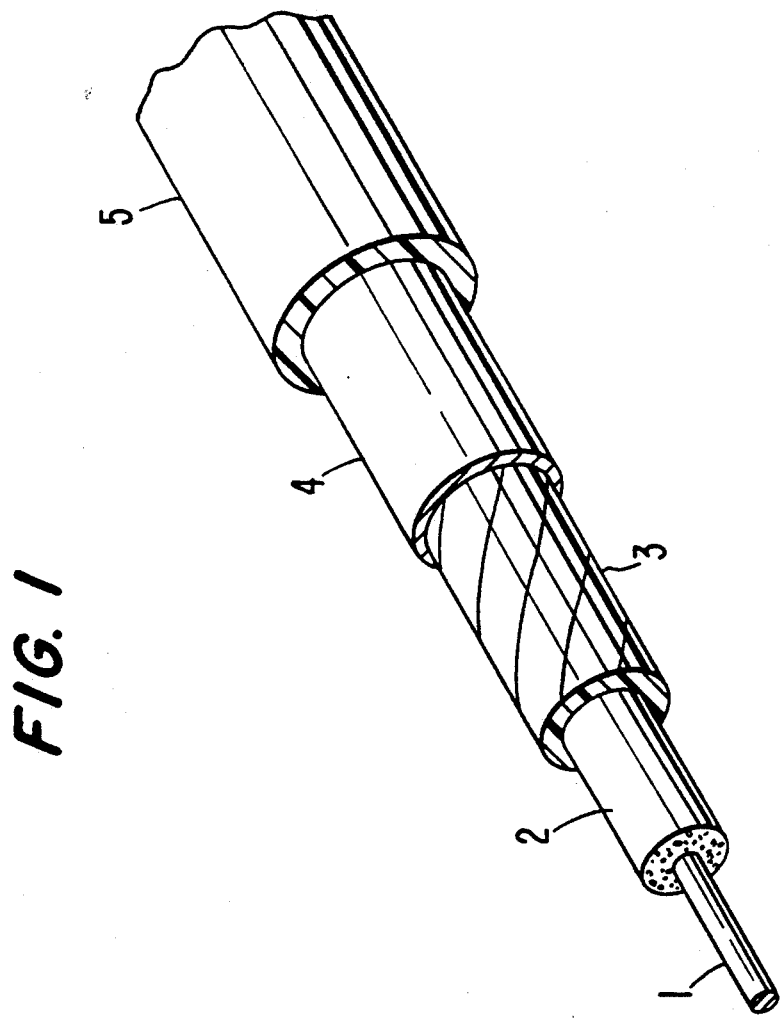
FIG. 1 is a perspective view of a cable of the invention with layers display the internal structure of the cable.

FIG. 1 is a perspective drawing of a cable of the invention which is a single electric signal cable with the various layers removed in order to display the inner structure of the cable. The center, conductor 1, which may be a solid or a stranded multifilament electrical conductor, is surrounded by insulation 2 or dielectric, which is shown as porous, in that a porous insulation is preferred, especially an ePTFE insulation, described above in the listed patents to that material. Porous polymers show very low dielectric constants, the lowest being that of highly porous ePTFE. A thermoplastic insulation may be extruded around center conductor 1. A non-thermoplastic polymer, such as ePTFE, is best applied as a spirally wound tape, which may be sintered into a unitary whole after application by application of heat for the required time at a temperature near its initial softening or melting point.

A thin wrap of metal platable polymer tape 3 is now applied, as little as one overlapping layer of about one micron in thickness being needed. Any smooth flexible polymer tape may be used which has mechanical voids, crevaces, and the like to which a metal layer may cling or be wedged into to provide a mechanical grip on the polymer surface. Polyamide (nylon) is the preferred polymer in that numerous effective metal-plating processes are known which can lay down a very thin smooth plating of a conductive or magnetic metal on polyamide.

The polymer tape may be metal-plated, then wrapped around insulation 2 or the polymer tape may be first wrapped around insulation 2, heat sealed, then metal-plated.

The metal layer 4 plated on tape 3 is very thin and may be of an electrically conductive metal or alloy, such as copper, aluminum, silver, or gold or may be a magnetic metal, such as iron, cobalt, nickel or transition metal, which may also be electrically conductive. The plating 4 blocks signal interfering radiation from penetrating the cable to the signal conductor 1 or any signal from radiating outwardly from the cable to disturb signals in an adjacent cable or electronic apparatus.

The cable is usually finished by applying a protective polymer jacket 5 to the outside of the cable, usually by extrusion of a thermoplastic highly resistant to damages from the environment of the cable. Polyvinyl chloride, polyurethane, chloroprene type rubber, and fluorinated olefin polymers are examples of useful jacket polymers. A sintered ePTFE tape wrapped jacket may be used.

Instead of a single electrical signal cable, more than one electrical signal cable may be used in the cable of the invention, each cable having its own insulation, the cables as a unit being covered with a layer of extruded polyamide or a tape-wrap of polyamide tape.

Figure 2:
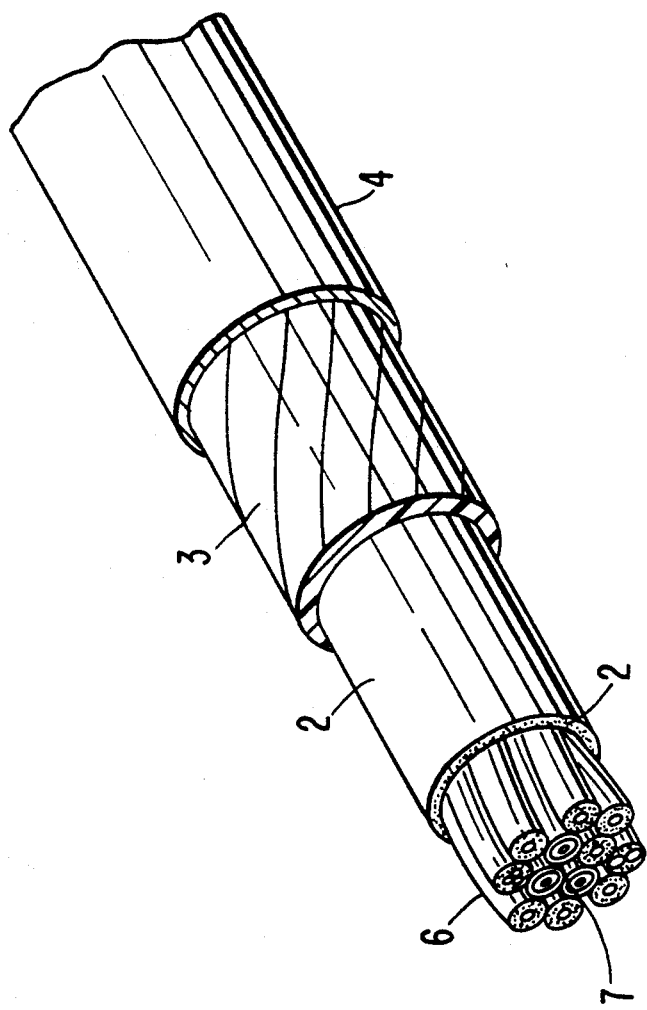
FIG. 2 perspective view of a cable of the invention which includes optical signal fibers and electrical signal cables.

If optical fiber signal cables are included in the cable of the invention, one or more single or multi-mode optical fibers may be included, but at least one electrical signal cable must also be included in the unit. Such a cable is shown in FIG. 2, where insulated electrical signal cables 6 are bundled with optical fiber signal cables 7 inside insulation 2. A thin layer of polyamide 3 is extruded or tape-wrapped over insulation 2. Conductive metal layer 4 is then plated on polyamide layer 3.

The cable of the invention provides a very lightweight flexible thin cable having good electrical and/or magnetic protection of the signals it transmits. The thinness of the overall cable combined with the thinness of the shielding layer results in a cable of unusual flexibility and a minimum amount of material needed to provide a high level of signal capacity and quality.

I claim:

1. A signal cable comprising from inside to outside:
   (a) at least one electrical signal cable;
   (b) at least one optical fiber cable;
   (c) said electrical signal cable comprising a conductive metal center conductor surrounded by insulation;
   (d) said optical fiber cables coated with a cladding of lower refractive index than said fiber and surrounded by a soft expanded polytetrafluorethyleen buffer layer;
   (e) a layer of polymer having a non-smooth metal-platable surface; and
   (f) a thin layer of metal plated on said polymer surface.

2. The cable of claim 1 wherein said electrical insulation comprises a porous polymer.

3. The cable of claim 2 wherein said porous polymer comprises expanded polytetrafluoroethylene.

4. The cable of claim 3 wherein said polymer having a metal-platable surface comprises polyamide.

5. The cable of claim 4 wherein said polyamide comprises polyamide tape.

6. The cable of claim 5 wherein said layer of metal is selected from the group consisting of copper, aluminum, silver, gold, iron, nickel, cobalt, a magnetic transition metal and conductive or magnetic alloys thereof.

7. The cable of claim 1 wherein said layer of polymer is less than 2 microns in thickness.

8. The cable of claim 1 wherein said layer of metal plated on said layer of polymer is less than 1 micron in thickness.

9. A signal cable of claim 1 surrounded by a protective polymer jacket.

10. A signal cable of claim 1 wherein said optical fiber cable is single mode.

11. A signal cable of claim 1 wherein said optical fiber cable is multi-mode.

12. A signal cable of claim 1 wherein said optical fiber cable is selected from the group polymer clad with amorphous fluoropolymer and quartz glass clad with glass.

* * * * *